(No Model.)
J. B. SMITH.
GATE.
No. 455,416. Patented July 7, 1891.
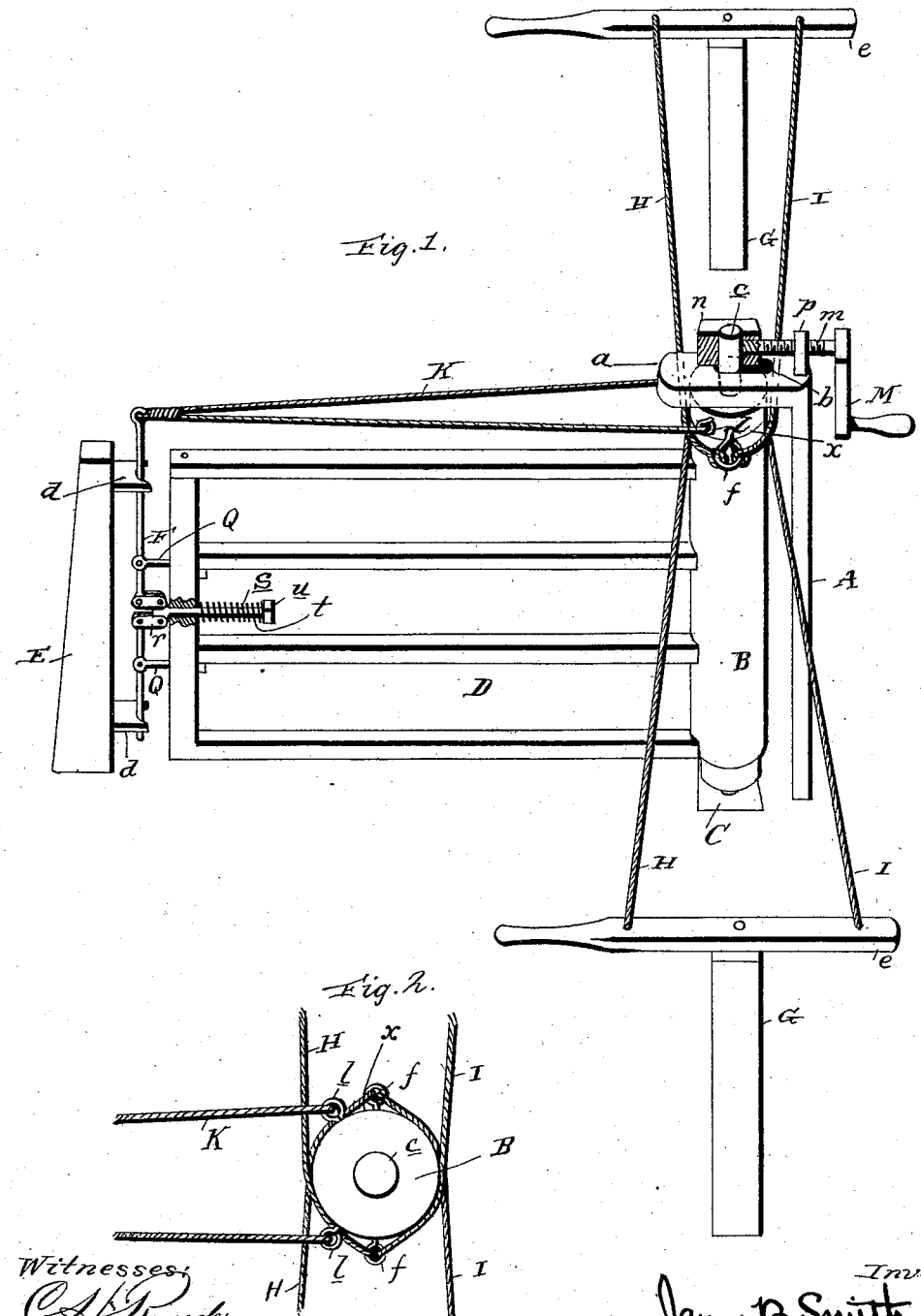

UNITED STATES PATENT OFFICE.

JAMES B. SMITH, OF FALLS CITY, NEBRASKA.

GATE.

SPECIFICATION forming part of Letters Patent No. 455,416, dated July 7, 1891.

Application filed November 1, 1890. Serial No. 370,030. (No model.)

*To all whom it may concern:*

Be it known that I, JAMES B. SMITH, a citizen of the United States, residing at Falls City, in the county of Richardson and State of Nebraska, have invented certain new and useful Improvements in Gates; and I do declare the following to be a full, clear, and exact description of the invention, such as will enable others skilled in the art to which it appertains to make and use the same.

This invention has relation to an improvement in farm-gates which may be opened by a person on foot or mounted upon a horse or seated in a vehicle, as the case may be, and the novelty will be fully understood from the following description and claims, when taken in connection with the accompanying drawings, in which—

Figure 1 is a perspective view of my improved gate complete, showing one of the rails partly broken away, better to display the latch; and Fig. 2 is a detail view, better illustrating the attachment of the operating-ropes to the pivot-post.

Referring by letter to the said drawings, A indicates the hinge-post for the gate. This post is provided at its upper end with a cap-block or horizontal arm $a$, which is provided with an elongated slot $b$, designed to receive a stud or pintle $c$, rising centrally from the gate-stile B. This stile B is journaled at its lower end in a suitable bearing C, firmly seated in the ground, so that it may freely turn, and with it the gate D, which may be of any ordinary or approved construction.

E indicates a latch-post, which is arranged at a suitable distance from the hinge-post and in a plane corresponding therewith. This latch-post E is provided on its inner side with two notched keeper-plates $d$, one near the upper and one near the lower end of said post.

F indicates a double latch-bar, which operates in conjunction with the two keeper-plates and a spring-actuating device, which will be hereinafter more fully explained.

At suitable distances from the gate and at opposite sides thereof I set posts G, upon which are pivoted hand-levers $e$. These hand-levers, which are preferably pivoted about midway of their length upon the posts G, are connected by operating cords or ropes H and I. Each rope H is attached at one end near one end of one of the levers $e$, and is thence carried half-way around the stile B and attached to an eye $f$, carried by a collar $x$, loosely mounted on the stile. The ropes I are attached at one end at or near the opposite end of the levers $e$, after which they are carried half-way around the gate-post and are also attached to the said eyes $f$. By this arrangement of the cords and levers it will be seen that the gate may be opened and closed by manipulating either or both of the hand-levers, as it is obvious that when one of the levers has been moved in one direction upon its pivot one of the cords leading to the hinge-post will be drawn taut and turn the collar $x$ upon the post, while the opposite rope or cord will be slackened during such operation, and by reversing the lever the cord which had been previously drawn taut will be slackened and the slackened one drawn taut, so as to open or close the gate, as the case may be.

K indicates the latch-cord. This cord or rope is connected with eyes $l$ or other suitable fastening devices on the collar $x$ in such a manner that said rope will draw upon the latch-lever as the collar is turned to the right or left, the points of attachment of said cords being eccentric with respect to the collar.

In use heavy gates of the character described, have a tendency to sag or bear downwardly at their outer unsupported ends, and in order to obviate this objection I have provided a means for taking up the gate and its hinge-post, so as to hold it in proper position at all times. By special reference to this adjusting device it will be seen that I provide a threaded rod $m$, having an eye $n$ on one end, which is designed to receive the stud or pintle $c$ after it has passed through the slot in the cap-block $a$. This rod is provided at its opposite end with a hand-crank M, having a screw-tapped aperture which is designed to take into the threads on the rod $m$ and bear against the upright post A. The rod is held in position by means of a loop $p$ or other suitable guide.

In operation it will be seen that when the gate is new or newly constructed the hand-crank may be turned upon the threaded rod, so as to allow the pintle in the post B to bear against the forward wall of the elongated slot in the cap-block. As the gate begins to wear and sag at its outer end it is simply necessary to turn the hand-crank upon the threaded rod until the pintle of the post B has been drawn back into the slot of the cap-block sufficiently to raise the gate as desired. In this latter case the bearing is removed from the cap-block and comes upon the eye in the threaded rod, which of course is supported by the upright A. The latch-bars F are pivoted to arms $q$ on the gate, and their outer ends or portions enter the grooves of the keepers in the latch-post. The adjacent ends of these latch-rods are connected by links $r$ with a horizontal rod $s$. This horizontal rod passes through a hole in the forward vertical bar of the gate, and a spring $t$ surrounds said rod and is held against said gate-rail by means of a nut $u$. The upper section of the latch-lever is connected with the hinge-post by the cord K, and it will be seen that as such cord is drawn upon by the movements of the gate the upper section of the latch will have its upper end drawn inwardly and away from the upper keeper, while its lower end will be moved in an opposite direction, drawing out the spring-surrounded rod, which in turn moves outwardly the upper end of the lower latch-section, and consequently moves inwardly and away from the lower keeper the lower end of said lower latch, the spring $t$ operating to throw out the latches as force is removed from the cords K.

Although I have minutely described the several elements of my improved gate, yet it is obvious that in practice such changes or modifications may be made as fairly fall within the scope of my invention, and I therefore do not desire to be understood as confining myself to the specific construction and arrangement of parts herein disclosed.

Having described my invention, what I claim is—

1. A gate having its hinge-post stepped in a suitable bearing and its upper end provided with a stud or pintle, in combination with a post or upright provided with a cap-block having an elongated slot to receive said pintle, a threaded rod having an eye to also receive the pintle of the post, and a hand-crank provided with a screw-tapped aperture to receive one end of the threaded rod and adapted to impinge against the back of the cap-block, substantially as specified.

2. The latch-bar composed of the two sections, which sections are pivoted at a point in their length to the forward upright rail of the gate, in combination with a horizontal rod bearing in said rail and connected with the adjacent ends of the latch-bars, a spring surrounding said horizontal rod, a nut backing the spring on the rod, and a cord or rope connecting the upper end of the upper latch-bar eccentrically with the gate-post, substantially as specified.

In testimony whereof I affix my signature in presence of two witnesses.

JAMES B. SMITH.

Witnesses:
ORVILLE SCHOENHEIT,
C. GILLESPIE.